C. O. HARRINGTON.
CIRCUIT CONTROLLER.
APPLICATION FILED SEPT. 5, 1913.
1,132,473.
Patented Mar. 16, 1915.
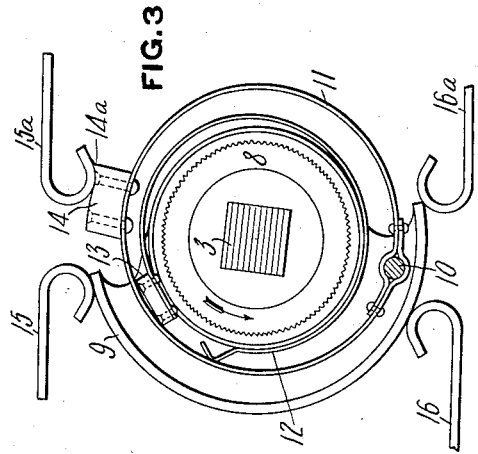
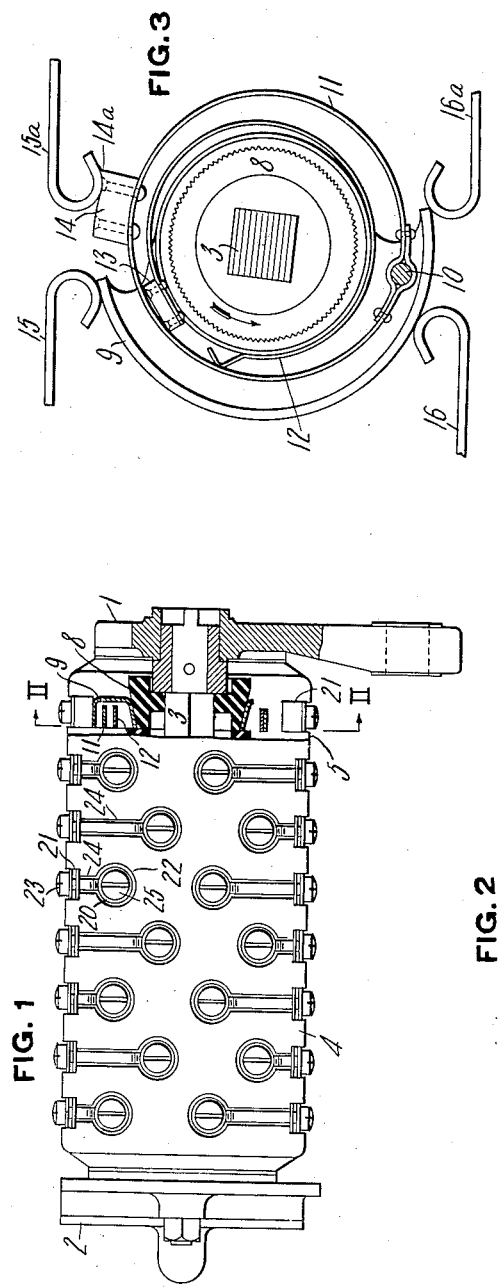
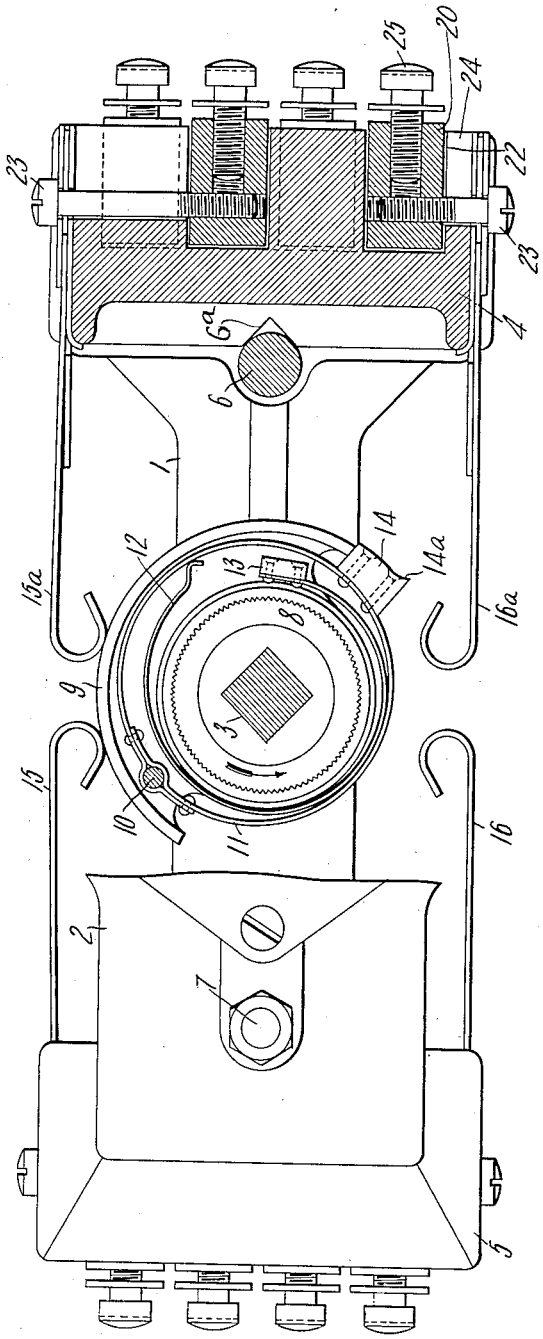
WITNESSES
W. T. Holman
A. L. Vencill
INVENTOR
Clinton O. Harrington
By Geo. E. Cruse
His Atty.

UNITED STATES PATENT OFFICE.

CLINTON O. HARRINGTON, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

CIRCUIT-CONTROLLER.

1,132,473.

Specification of Letters Patent.

Patented Mar. 16, 1915.

Application filed September 5, 1913. Serial No. 788,300.

*To all whom it may concern:*

Be it known that I, CLINTON O. HARRINGTON, a citizen of the United States, residing at Edgewood Borough, in the county of Allegheny and State of Pennsylvania, have invented certain new and useful Improvements in Circuit-Controllers, of which the following is a specification.

My invention relates to circuit controllers. I will describe one form of circuit controller embodying my invention, and will then point out the novel features thereof in claims.

In the accompanying drawings, Figure 1 is a view showing in side elevation, partly sectioned, one form of circuit controller embodying my invention. Fig. 2 is an end elevation of the device shown in Fig. 1 looking from the left, the device being partly sectioned on the line II—II, and the rotatable member being in one position. Fig. 3 is a fragmental view similar to a portion of Fig. 2 but showing the rotatable member in another position.

Similar reference characters refer to similar parts in each of the several views.

Referring first to Figs. 1 and 2, the reference characters 4 and 5 designate blocks of insulating material mounted between end plates 1 and 2; the end plates are drawn toward each other by bolts 6 and 7, thus clamping the blocks firmly in place between the plates. The bolts 6 and 7 are located between the blocks 4 and 5, and are not attached thereto but are partially embedded in V-shaped grooves 6ª in the inner faces of these blocks. Mounted to oscillate in bearings in the end plates 1 and 2 is a shaft 3 which, as here shown, is of square cross section except at its ends which are rounded to fit the bearings in the end plates. This shaft carries one or more rings 8 of insulating material, only one being shown in the drawings. This ring is provided with a square hole which fits tightly on the shaft so that after being forced into proper position on the shaft it will remain fixed in such position. As here shown, the ring 8 comprises a comparatively narrow web and a peripheral flange extending in each direction from the web. A portion of the periphery of the ring is tapered as shown in Fig. 1 and the tapered portion is provided with teeth around its entire circumference as shown in Figs. 2 and 3. The insulation ring carries a contact member or segment 9 of electro-conductive material in the form of an annular ring the bore of which is tapered to fit the tapered portion of the periphery of the insulation ring 8; the bore of the segment 9 is also provided with teeth which match the teeth on the periphery of the insulation ring. The periphery of the segment forms a contacting surface as shown in Figs. 2 and 3.

Mounted in the blocks 4 and 5 are a plurality of contact brushes 15, 15ª, 16 and 16ª, which are adapted to make electrical contact with the contact surface of the segment 9. Each brush is located in a slot 21 in the top or bottom face of the block 4 or 5. Each brush is provided with a cylindrical terminal block 20 which is located in a cylindrical hole 22 in the block; each brush is held securely in its slot 21 by a screw 23 which passes through a slot in the brush, a slot 24 in the insulation block, and a tapped hole in the corresponding terminal block 20. The outside face of each terminal block 20 is provided with a screw 25 by means of which wires may be electrically connected with the terminal block. The holes 22 are staggered in location in order to separate the adjacent terminal blocks 20 by the greatest possible distance and thereby obtain the largest amount of insulating material between these blocks.

One feature of my invention is the provision of means for breaking the electrical connection between the contact member or segment 9 and brush 15ª at one relative position of the two during movement of the segment in one direction, and for closing this connection at a different relative position of the two during movement of the segment in the other direction. As here shown, this means comprises a block 14 of electro-conductive material mounted adjacent one end of the segment and biased toward the segment. This block is fixed on a ring 11 which is located within the peripheral flange of the segment and is pivoted to oscillate on a stud 10 fixed in the radial web of the segment. The ring 11 and stud 10 are of electro-conductive material, so it will be seen that the block 14 is constantly in electrical connection with the segment.

The ring 11 and block 14 are normally biased to such position that the block engages the end of the peripheral flange of the segment, this being the position of the parts shown in Fig. 2; as here shown, this bias is effected by means of a circular spring 12, one end of which is secured to a block 13 mounted on the web of the segment and the other end of which presses against the ring 11 as shown in the drawing.

The surface of the block 14 is, as here shown, slightly raised above the contacting surface of segment 9, and the surface of the block is provided with a lip 14$^a$ at the end farthest from the segment. It will be seen, therefore, that the block 14, and particularly the lip 14$^a$, is in position to engage the brush 15$^a$.

The operation of the circuit controller is as follows: When the shaft 3 is rotated in the direction indicated by the arrows in Figs. 2 and 3, the segment 9 slides on brush 15$^a$ until the latter engages block 14; as the shaft continues to rotate, brush 15$^a$ drags the block 14 away from the end of the segment; the block then slides on the brush 15$^a$ until the spring reaches the lip 14$^a$, when the block 14 is dragged still farther away from the segment until ring 11 reaches the corner of block 13. This is the position of the parts as shown in Fig. 3. Then upon further movement of the shaft 3 the block 14 is drawn away from brush 15$^a$ and is snapped back to its normal position against the end of the segment by spring 12. When the shaft 3 is then rotated in the direction opposite to that indicated by the arrows, the block 14 merely makes contact with brush 15$^a$ in the same manner as though the block were an integral portion of the segment, and the block 14 and segment 9 then make sliding contact with the spring 15$^a$ in the usual manner. It will be seen, therefore, that when the shaft 3 is rotated in the direction indicated by the arrow, the block 14 breaks contact with brush 15$^a$ at one point in the movement of the shaft, and that when the shaft rotates in the other direction, the block 14 makes contact with brush 15$^a$ at another point in the movement of the shaft, the latter point being removed several degrees from the former point in the direction opposite to that indicated by the arrow.

Having thus described my invention, what I claim is:

1. A circuit controller comprising a contact member, a brush member adapted to make contact therewith, means for mounting one of said members for movement with relation to the other, a contact block carried by said contact member and located adjacent one end thereof and capable of movement toward and away from said end, means for biasing said block toward the said end of the contact member, and a lip on the surface of the block adapted for engagement with the brush member whereby the block is drawn away from the contact member by the brush member during movement of the movable member in one direction.

2. A circuit controller comprising a contact segment, means for mounting said segment so that it may be oscillated, a fixed brush adapted to make contact with said segment, a contact block carried by said segment and located adjacent one end of the segment and movable toward and away from the segment, means for biasing the block toward said end of the segment, and a lip on the block adapted for engagement with the brush whereby the segment draws away from the block during oscillation in one direction.

3. A circuit controller comprising a contact segment, means for mounting said segment so that it may be oscillated, a brush mounted to make contact with said segment, a contact block carried by the segment and movable toward and away from one end of the segment, and means for biasing the block toward the segment, the contacting surface of the block projecting slightly beyond the contacting surface of the segment whereby the block is engaged by the brush and the segment therefore draws away from the block during movement of the segment in one direction.

4. A circuit controller comprising a contact segment having a web and a flange, means for mounting said segment so that it may be oscillated, a supporting member pivotally attached to said web, a contact block carried by said supporting member and forming a continuation of one end of the segment, a spring acting on said segment and on said supporting member for biasing the contact block toward the said end of the segment, and a brush mounted to bear on the segment and on the block whereby when the segment oscillates in one direction the contact block is retained by the brush and the segment draws away from the block.

5. A circuit controller comprising a contact segment, means for mounting said segment so that it may be oscillated, a contact block movably attached to said segment and located adjacent one end of the segment, a spring acting on the segment and on the block for biasing the block toward the said end of the segment, and a brush mounted to engage with the segment and block, whereby the block is retained by the brush so that the segment draws away from the block during oscillation of the segment in one direction.

In testimony whereof I affix my signature in presence of two witnesses.

CLINTON O. HARRINGTON.

Witnesses:
A. HERMAN WEGNER,
R. L. KISTLER.